US007617726B2

(12) United States Patent
Douglas

(10) Patent No.: US 7,617,726 B2
(45) Date of Patent: Nov. 17, 2009

(54) METHOD AND APPARATUS FOR VEHICLE WHEEL BALANCER IMBALANCE CORRECTION WEIGHT TYPE SELECTION

(75) Inventor: Michael W. Douglas, St. Charles, MO (US)

(73) Assignee: Hunter Engineering Company, Bridgeton, MO (US)

( * ) Notice: Subject to any disclaimer, the term of this patent is extended or adjusted under 35 U.S.C. 154(b) by 376 days.

(21) Appl. No.: 11/432,610

(22) Filed: May 11, 2006

(65) Prior Publication Data

US 2006/0254361 A1 Nov. 16, 2006

Related U.S. Application Data

(60) Provisional application No. 60/680,221, filed on May 12, 2005.

(51) Int. Cl.
G01M 1/08 (2006.01)
G01M 1/16 (2006.01)
(52) U.S. Cl. .......................................... 73/462; 73/460
(58) Field of Classification Search .................. 73/462, 73/460, 487; 301/5.21, 5.22; 702/56
See application file for complete search history.

(56) References Cited

U.S. PATENT DOCUMENTS

| 5,365,786 | A | | 11/1994 | Douglas |
| 5,526,686 | A | * | 6/1996 | Fuchs et al. ................... 73/462 |
| 5,915,274 | A | | 6/1999 | Douglas |
| 5,969,247 | A | * | 10/1999 | Carter et al. .................. 73/462 |
| 5,983,717 | A | | 11/1999 | Diez |
| 6,293,147 | B1 | * | 9/2001 | Parker et al. .................. 73/462 |
| 6,484,574 | B1 | * | 11/2002 | Douglas et al. ............... 73/462 |
| 6,609,424 | B2 | * | 8/2003 | Colarelli et al. ............... 73/460 |
| 6,952,964 | B2 | * | 10/2005 | Gerdes et al. ................. 73/462 |
| 6,983,656 | B2 | * | 1/2006 | Cullum et al. ................ 73/487 |
| 7,191,651 | B2 | * | 3/2007 | Douglas et al. ............... 73/462 |
| 7,199,873 | B2 | * | 4/2007 | Braghiroli ............. 356/139.09 |
| 7,355,687 | B2 | * | 4/2008 | Voeller et al. .......... 356/139.09 |
| 2004/0165180 | A1 | * | 8/2004 | Voeller et al. .......... 356/139.09 |

* cited by examiner

*Primary Examiner*—Helen C. Kwok
(74) *Attorney, Agent, or Firm*—Polster, Lieder, Woodruff & Lucchesi, L.C.

(57) ABSTRACT

A method of operation of a vehicle wheel balancer system for identifying an imbalance correction weight mode which an operator desires to utilize during an imbalance correction procedure without requiring the operator to manually input or select an imbalance correction weight mode prior to beginning the placement of the imbalance correction weights. The imbalance correction weight mode is determined from operator guided movements of one or more dataset arms which identify if an operator-selected imbalance correction weight placement plane is associated with a clip-on imbalance correction weight, an adhesive imbalance correction weight, or a patch-type imbalance correction weight.

22 Claims, 7 Drawing Sheets

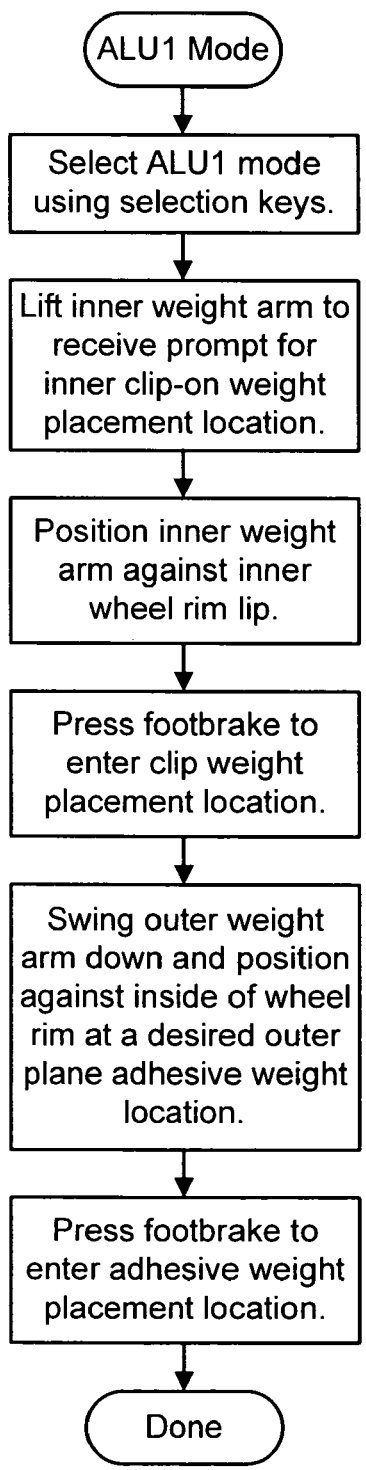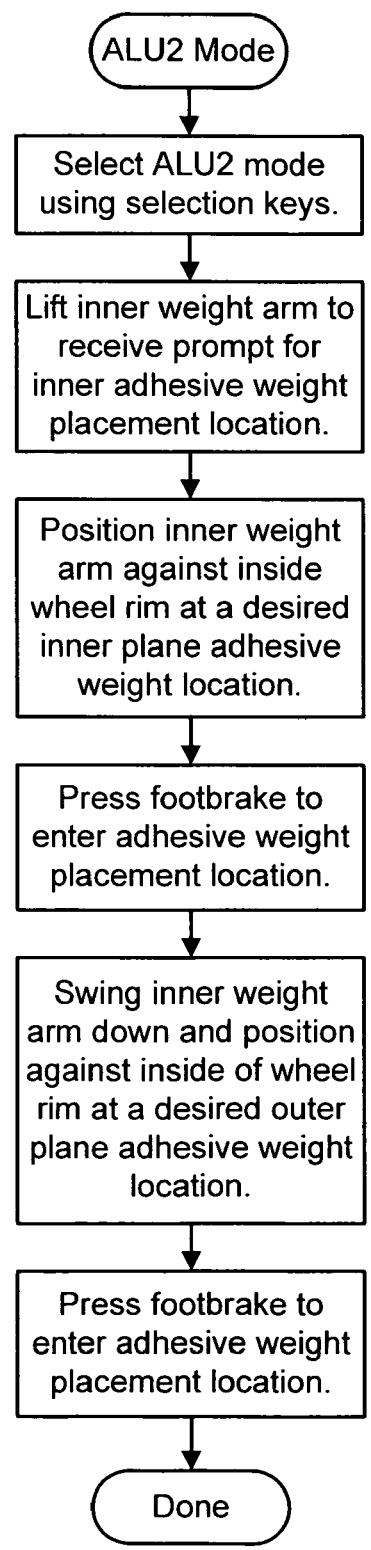

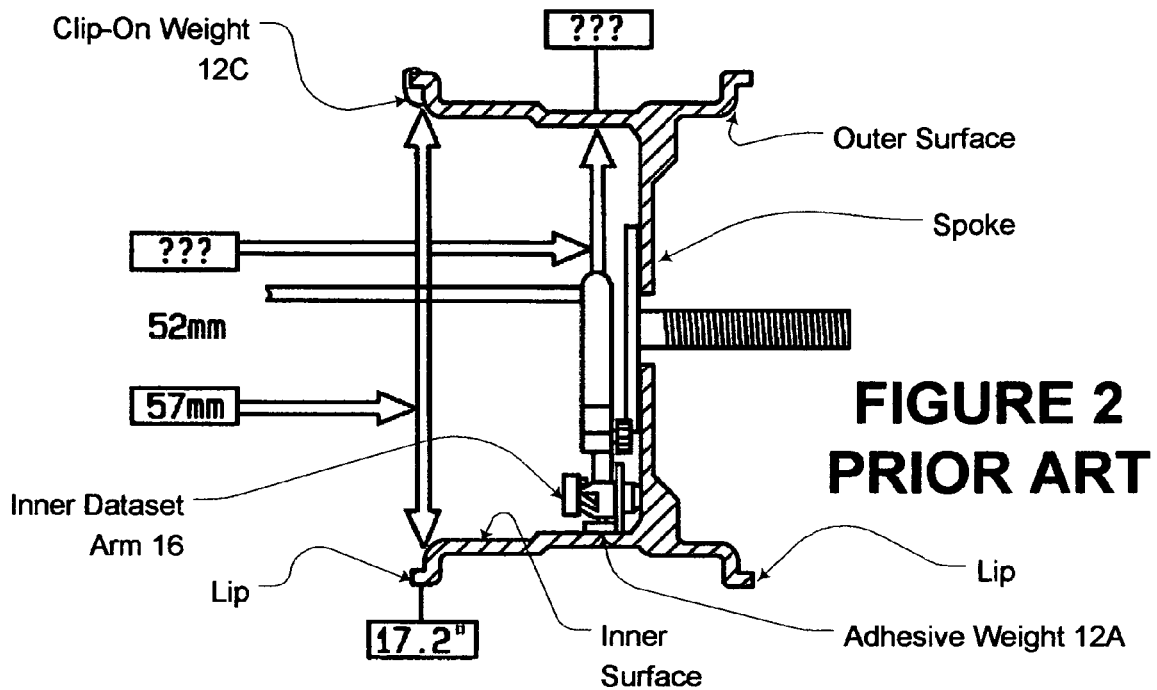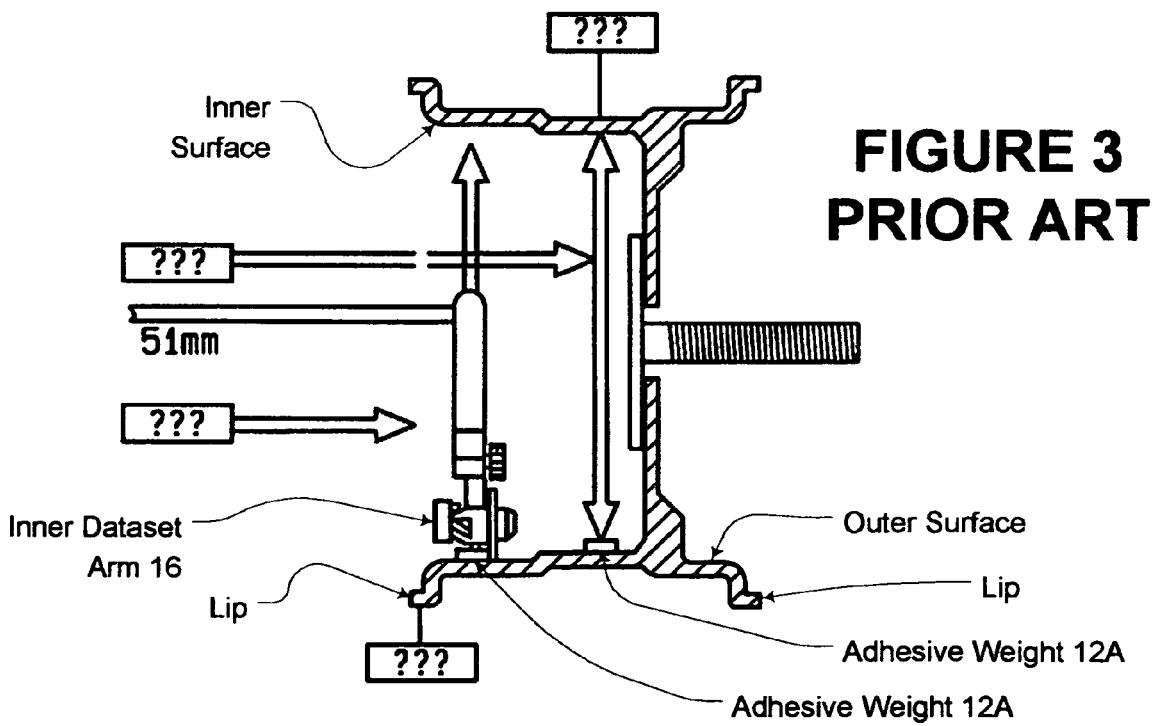

METHOD AND APPARATUS FOR VEHICLE WHEEL BALANCER IMBALANCE CORRECTION WEIGHT TYPE SELECTION

CROSS-REFERENCE TO RELATED APPLICATIONS

The present application is related to, and claims priority from, U.S. Provisional Patent Application Ser. No. 60/680,221 filed on May 12, 2005, which is herein incorporated by reference.

STATEMENT REGARDING FEDERALLY SPONSORED RESEARCH

Not Applicable.

BACKGROUND OF THE INVENTION

The present invention relates generally to vehicle wheel balancer systems configured to assist in the placement of imbalance correction weights on a vehicle wheel assembly to reduce imbalance forces, and in particular, to a vehicle wheel balancer system configured to automatically identify the type of imbalance weight which an operator desires to place on the vehicle wheel assembly based upon the operator's placement and/or movement of a dataset arm.

All wheel balancer systems support a number of balancing "modes" which identify to the wheel balancer system a type of imbalance correction weight to be used for at an imbalance correction location (plane). The imbalance correction weight types (clip-on, adhesive, and patch) need to be known to the wheel balancer system because each type of imbalance correction weight requires different dimensional offsets to nominal dimensions of the vehicle wheel rim, and different compensations for the curvature of the imbalance correction weight during application, as is disclosed in U.S. Pat. No. 5,365,786 herein incorporated by reference.

In generally, a vehicle wheel assembly consists of a wheel rim on which is mounted a tire. The wheel rim has inner and outer wheel rim lips, which provide attachment locations for clip-on imbalance correction weights. The inner surface of the wheel rim is generally defined as the surfaces between the plane of the spokes of the wheel rim and the inner wheel rim lip, while the outer surface of the wheel rim is generally defined as the surfaces between the plane of the spokes of the outer wheel rim lip.

The imbalance correction weight types associated with different balance modes of operation for a wheel balancer system are typically, but not exclusively, selected as follows:

| Mode Name used by Hunter Engineering Co. | Dynamic 2-Plane Balancing Inner Weight Type | Dynamic 2-Plane Balancing Outer Weight Type | Static 1-Plane Balancing Static Weight Type |
| --- | --- | --- | --- |
| STD | Clip-On | Clip-On | Clip-On |
| ALU1 | Clip-On | Adhesive | Adhesive |
| ALU2 | Adhesive | Adhesive | Adhesive |
| PATCH | Patch | Patch | Patch |

Some wheel balancer systems, such as those from Hunter Engineering Co. of Bridgeton, Mo., allow for the placement of adhesive imbalance correction weights in any plane between the inner and outer edges of the wheel. Some manufacturers display a select few of these placement planes to create more "modes" such as ALU3, 4, 5, etc. However, for all applications, the inner and outer imbalance correction weights must each be selected from one of the three imbalance correction weight types identified above.

Generally, wheel balancer systems rely on the operator to select the desired imbalance correction weight arrangement (balance mode) via a selection key, or from a list or a series of images on a graphic display. On some vehicle wheel balancer systems, these modes are selected directly by a keypad button or from buttons which have corresponding graphics either on the button or adjacent to the button as artwork, which is typical for an LED display vehicle wheel balancer system having limited graphics display capability.

Selection of different modes of operation in a vehicle wheel balancer for the use of different types of imbalance correction weights typically requires the operator to carry out a multi-step process, For example, as shown in FIG. 1, a GSP-Series vehicle wheel balancer from Hunter Engineering Co. of Bridgeton, Mo. requires six steps to select and utilize a balance mode where the inner plane utilizes a clip-on weight, and the outer plane utilizes an adhesive weight, i.e., the "ALU1" mode illustrated in FIG. 2. These steps require the operator to initially select the ALU1 mode using a selection key or other suitable input device on the wheel balancer system. Next, the inner weight placement or dataset arm is lifted from a "home" position. Once the dataset arm is lifted, the operator moves it in an axial direction to align the arm with the plane of the inner wheel rim lip, and then rotates the dataset arm to bring it into contact with the wheel rim lip. With the dataset arm in contact with the wheel rim lip, the operator "enters" the clip-on imbalance correction weight placement location such as by pressing a footbrake or other suitable input key on the wheel balancer system, or any other suitable means. Next, the operator is required to identify an adhesive imbalance correction weight position for the outer imbalance correction weight. This may be done by either moving the inner dataset arm to contact an inside wheel rim surface, or by moving the outer dataset arm from a "home" position, and positioning it in contact with an outer wheel rim surface on which an adhesive imbalance correction weight is to be placed. With either the inner or the outer dataset arm in contact with the wheel rim surface, the operator "enters" the adhesive imbalance correction weight placement location such as by pressing the footbrake or other suitable input key. The clip-on and adhesive imbalance correction weight placement locations about the vehicle wheel assembly have now been identified for use in the "ALU1" imbalance correction mode. Other commonly available wheel balancer systems require the operator to perform similar sequences of steps.

Different sequences of steps are utilized to select different modes. For example, to select a balance mode where both the inner plane and outer plane utilize a adhesive weight as shown in FIG. 3, i.e. the "ALU2" mode in the GSP-Series vehicle wheel balancer from Hunter Engineering Co. of Bridgeton, Mo., the six steps illustrated in FIG. 4 carried out. These steps require the operator to initially select the ALU1 mode using a selection key or other suitable input device on the wheel balancer system. Next, the inner weight placement or dataset arm is lifted from a "home" position. Once the dataset arm is lifted, the operator moves it in an axial direction and then rotates the dataset arm to bring it into contact with the inner wheel rim surface. With the dataset arm in contact with the inner wheel rim surface, the operator "enters" the clip-on imbalance correction weight placement location such as by pressing a footbrake or other suitable input key on the wheel balancer system. Next, the operator is required to identify an adhesive imbalance correction weight position for the outer imbalance correction weight. This may be done by either moving the inner dataset arm further inward to contact the inside wheel rim surface at a different location, or by moving the outer dataset arm from a "home" position, and positioning it in contact with an outer wheel rim surface on which an adhesive imbalance correction weight is to be placed. With either the inner or outer dataset arm in contact with the wheel rim surface, the operator "enters" the second adhesive imbalance correction weight placement location such as by pressing the footbrake or other suitable input key. The inner and outer adhesive imbalance correction weight placement locations about the vehicle wheel assembly have now been identified for use in the "ALU2" imbalance correction mode.

Similarly, to select a balance mode where both the inner plane and outer planes utilize patch weights placed inside the tire (i.e., PATCH mode illustrated in FIG. 5) and to select a standard balancing mode wherein both of the imbalance correction weights are of the clip-on type (i.e., STANDARD mode illustrated in FIG. 6) each require six basic steps when carried out on the GSP-Series vehicle wheel balancer from Hunter Engineering Co. of Bridgeton, Mo., as shown in FIGS. 7 and 8, respectively. Other commonly available wheel balancer systems require the operator to perform similar sequences of steps for the selection of imbalance correction weight types which may include a greater or lesser number of steps.

As is illustrated in FIGS. 1, 4, 7, and 8, changing the mode selection or weight plane selection on a vehicle wheel balancer requires the operator to proceed through a sequence of steps which take time to perform. Some systems have attempted to reduce the steps an operator must take. For example, U.S. Pat. No. 5,915,274, herein incorporated by reference, describes a system to scan a rim profile and automatically select imbalance correction weight plane locations for automatic selection of adhesive weight locations. But automatic selection of imbalance correction weight types such as clip-on, adhesive, or patch is not performed. The balance mode (imbalance correction weight types) must be manually selected by the operator before starting the automatic scanning and selection of the imbalance correction weight placement locations.

U.S. Pat. No. 5,983,717 assigned to Hoffman describes a wheel-type sensor which is capable of automatically set the balance mode based on the metallic composition of the vehicle wheel, i.e. steel or aluminum (alloy). However, the automatic selection does not accommodate the physical limitations of the vehicle wheel. For example, some alloy vehicle wheels may be balanced with clip-on imbalance correction weights instead of adhesive imbalance correction weights, while some steel wheels require the use of adhesive imbalance correction weights instead of clip-on imbalance correction weights. Additionally, it is desired to avoid the cost of such a sensor system and instead use existing measurement hardware.

Accordingly, it would be advantageous to provide an vehicle wheel balancer system with a method for automatically identifying the particular imbalance correction weight mode which an operator desires to utilize during an imbalance correction procedure, without requiring the operator to manually input or select the imbalance correction weight mode prior to beginning the placement of the imbalance correction weights.

BRIEF SUMMARY OF THE INVENTION

Briefly stated, the present invention provides a vehicle wheel balancer system with a method for automatically identifying the particular imbalance correction weight mode which an operator desires to utilize during an imbalance correction procedure, without requiring the operator to manually input or select an imbalance correction weight mode prior to beginning the placement of the imbalance correction weights. The imbalance correction weight mode is automatically determined in response to operator movement of the dataset or weight placement arm(s) which are used for entry of the wheel data associated with each "balance mode". Distance and diameter computations, together with detection of the inner dataset or weight placement arm vertical orientation, are utilized to determine if an operator-selected imbalance correction weight placement plane is associated with a clip-on, adhesive, or patch-type imbalance correction weight.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a flow chart of a prior art ALU1 mode selection process;

FIG. 2 is a prior art screen image of a wheel balancer system illustrating a ALU1 imbalance correction weight mode;

FIG. 3 is a prior art screen image of a wheel balancer system illustrating a ALU2 imbalance correction weight mode;

FIG. 4 is a flow chart of a prior art ALU2 mode selection process;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 9:
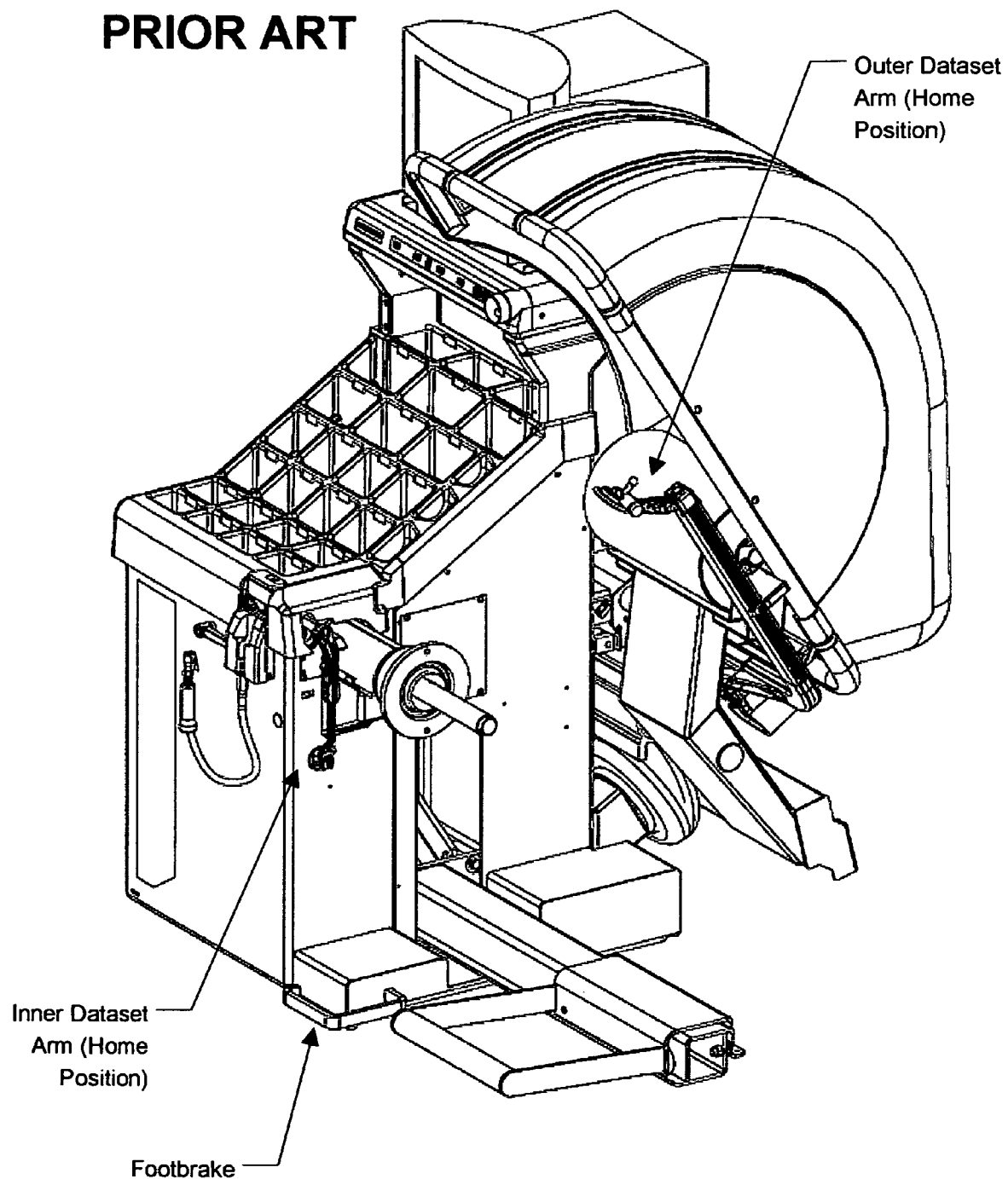
FIG. 9 is a perspective illustration of a prior art vehicle wheel balancer system, illustrating the various system components.

The present invention provides a method of operation for a vehicle wheel balancer system 10, such as shown in FIG. 9, which facilitates an automatic identification of a particular imbalance correction weight mode which an operator intends to utilize during an imbalance correction procedure. Differing imbalance correction weight modes require the placement of different types of imbalance correction weights 12 (i.e., adhesive weights 12A, clip-on weights 12c, and patch weights 12p) at different locations about a vehicle wheel assembly 14, such as at the inner or outer wheel rim lips, on an inner or outer surface of the wheel rim, or on an inner surface of a tire mounted to the vehicle wheel rim. The methods of the present invention do not require an operator to manually input or select an imbalance correction weight mode prior to the placement of the imbalance correction weights 12 on the vehicle wheel assembly 14. In general, the imbalance correction weight mode is automatically determined from the operator-guided movements of the inner and outer weight placement or measurement arms, generally referred to as dataset arms 16, 18, which are utilized for entry of wheel data.

Figure 10:
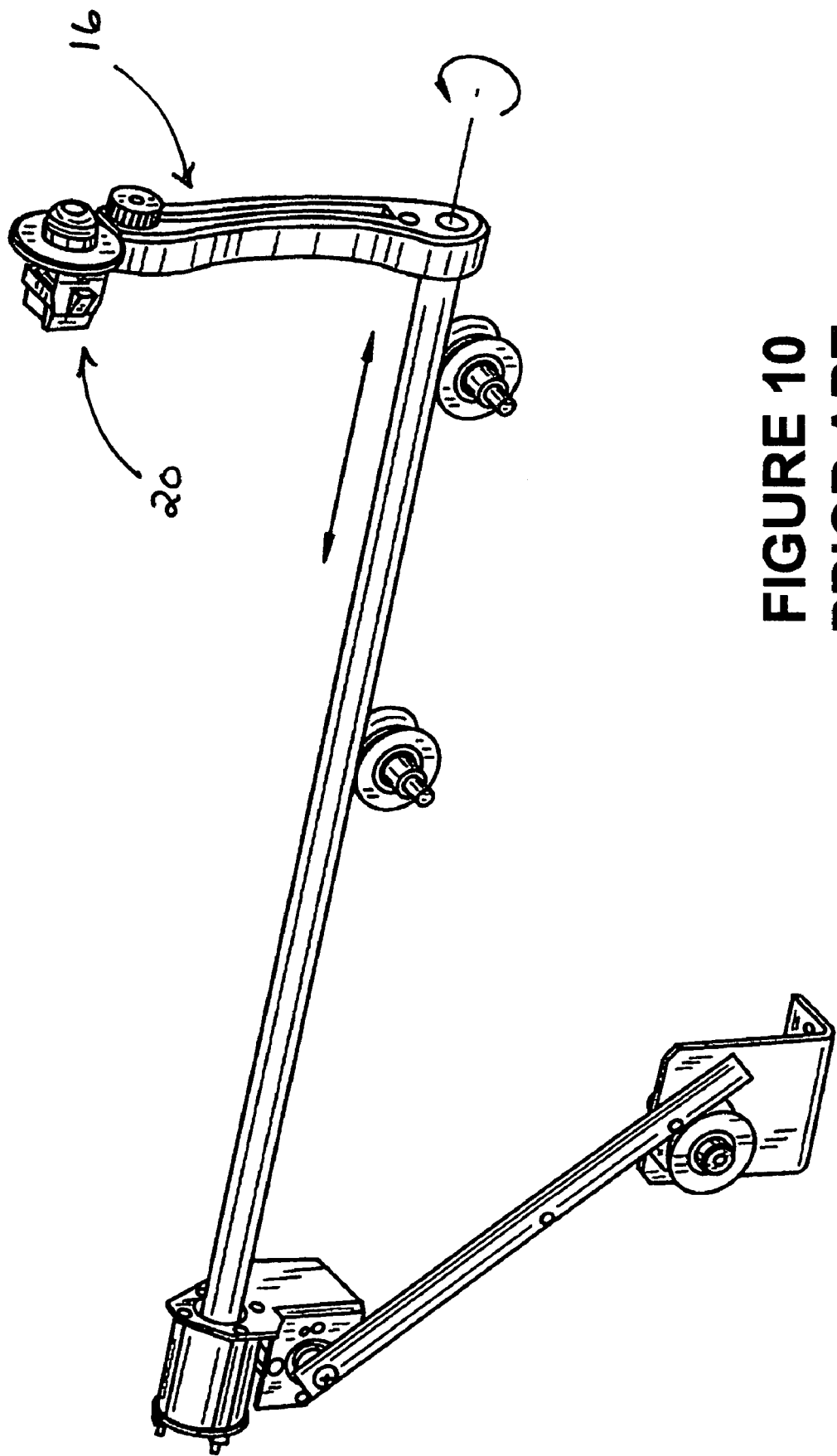
FIG. 10 is a perspective illustration of a prior art imbalance correction weight placement arm (dataset arm) rotated to an upward position.

The mechanical configuration and operation of an exemplary inner dataset arm 16, such as shown in FIG. 10, is described in U.S. Pat. No. 5,915,274, herein incorporated by reference, however, those of ordinary skill in the art will recognize that the present invention is not limited to use with any particular mechanical configuration for the inner and outer dataset arms 16, 18, and that any of a variety of such devices can be utilized with the methods set forth herein. For example, a dataset arm 16 need not include any mechanism 20 for actually securing or holding an imbalance correction weight.

The following detailed description of the methods of the present invention refer to the various types of imbalance correction weight mode selection procedures described above and illustrated in FIGS. 1-8, i.e. ALU-1, ALU-2, STANDARD, and PATCH modes of operation. Generally, the methods of the present invention require the vehicle wheel balancer system to observe the sequence in which the inner dataset arm and/or the outer dataset arms are lifted or moved away from a "home" position by an operator, the vertical position (up or down) of the inner dataset arm after it has been is lifted or moved, and any subsequent changes in the vertical position of the inner dataset arm. It will be noted that the methods described herein assume that the operator will be directed to identify the inner imbalance weight correction plane on the vehicle wheel assembly first, followed by an identification of the outer imbalance weight correction plane. The methods of the present invention may, however, be adapted by one or ordinary skill in the art for use on a vehicle wheel balancer system which requires identification of an outer imbalance weight correction plane before identification of an inner imbalance weight correction plane.

Movement of the dataset arms 16, 18 from their "home" or stored positions may be tracked by determining a measurement which is representative of a radial distance of a selected point on the dataset arm 16, 18 from a vehicle wheel assembly axis of rotation, and of a rotational position of the selected point about the vehicle wheel assembly axis of rotation. The operator guides the dataset arms 16, 18 into contact with the vehicle wheel assembly at a point in a vertical plane in which an imbalance correction weight is desired to be placed on the vehicle wheel assembly. The position of the vertical plane, and the placement within the vertical plane, identify the type of imbalance correction weight which may be placed at the selected location. Once the dataset arm 16, 18 is positioned in contact with the vehicle wheel assembly at the desired location, the operator "selects" or "identifies" that point to the vehicle wheel balancer system 10 by any suitable means, such as pressing a foot brake.

For the inner dataset arm 16 configured as shown in FIG. 10, an additional observation of an up/down orientation within a vertical plane is further utilized to determine if an operator-selected imbalance correction weight placement plane is associated with a clip-on imbalance correction weight, an adhesive imbalance correction weight, or patch-type imbalance correction weight. The identification of the type of imbalance correction weight which an operator is intending to place on the vehicle wheel assembly further identifies the imbalance correction weight mode of operation for the vehicle wheel balancer system to complete the imbalance correction procedure.

Figure 5:
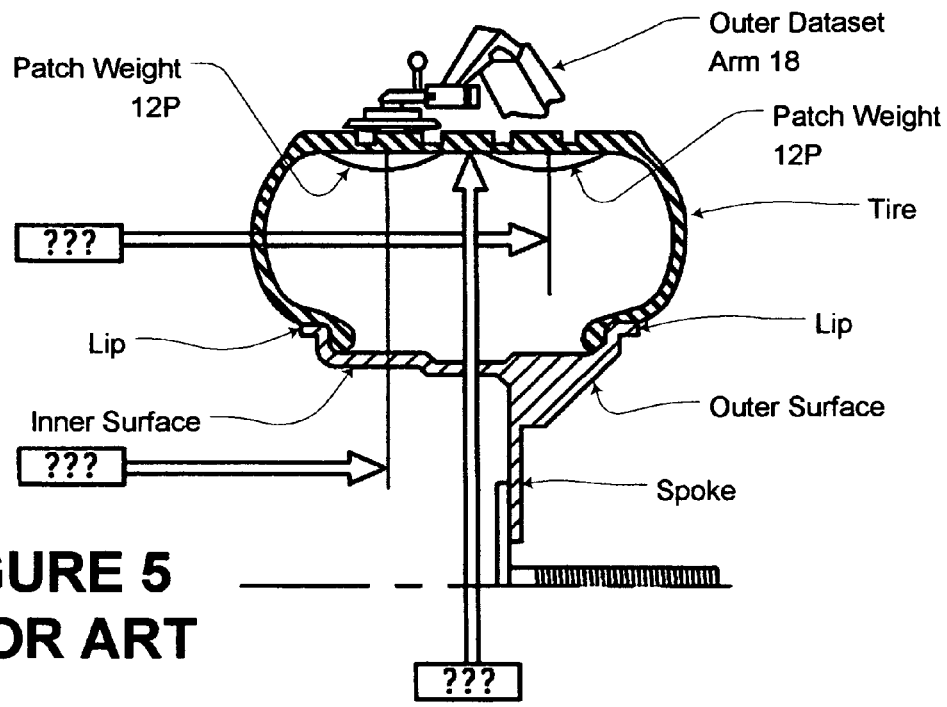
FIG. 5 is a prior art screen image of a wheel balancer system illustrating a patch imbalance correction weight mode.
Figure 6:
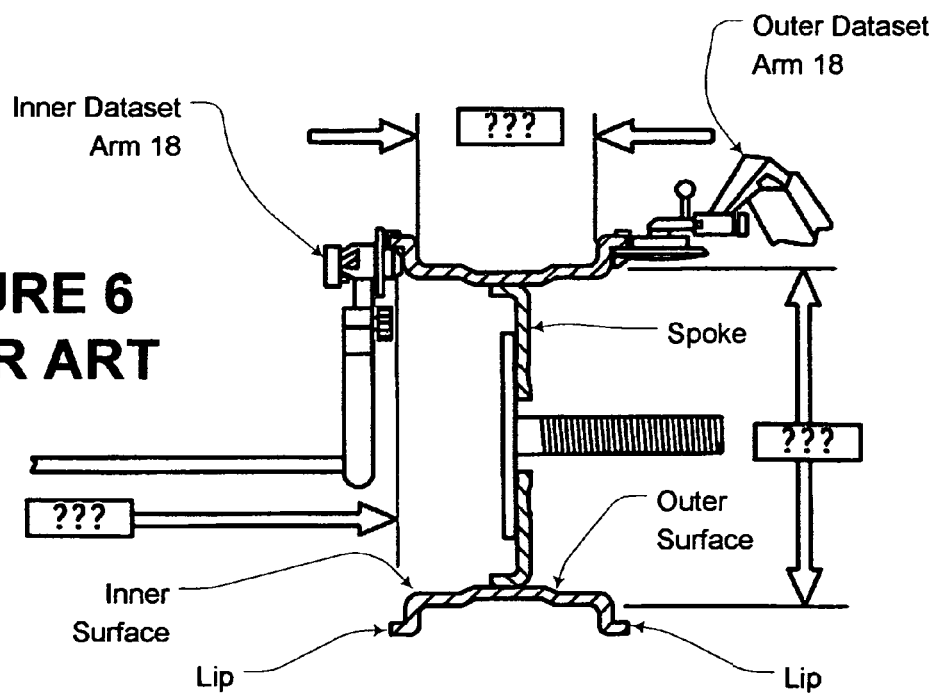
FIG. 6 is a prior art screen image of a wheel balancer system illustrating a standard clip-on imbalance correction weight mode.
Figure 7:
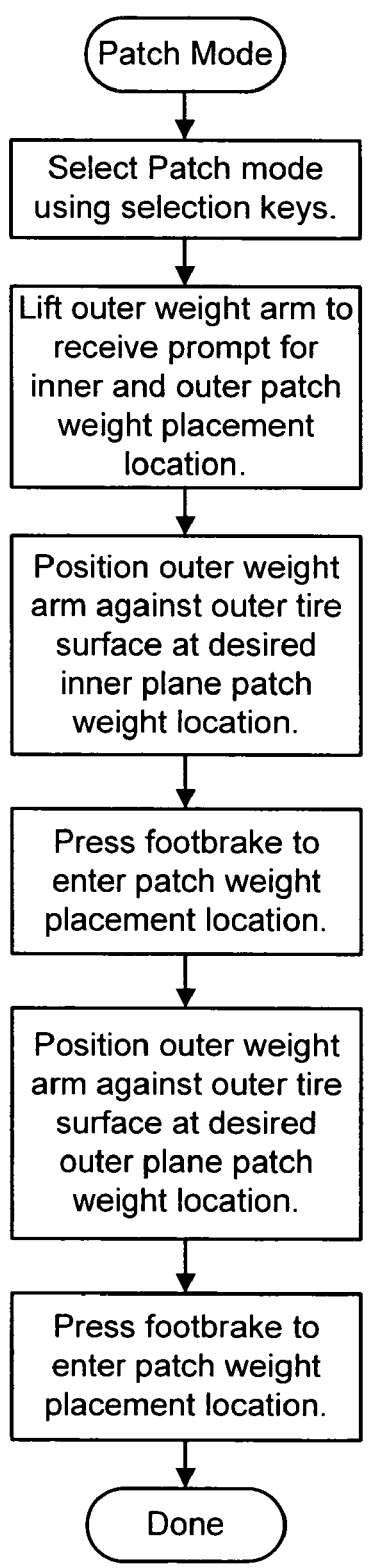
FIG. 7 is a flow chart of a prior art PATCH mode selection process.
Figure 8:
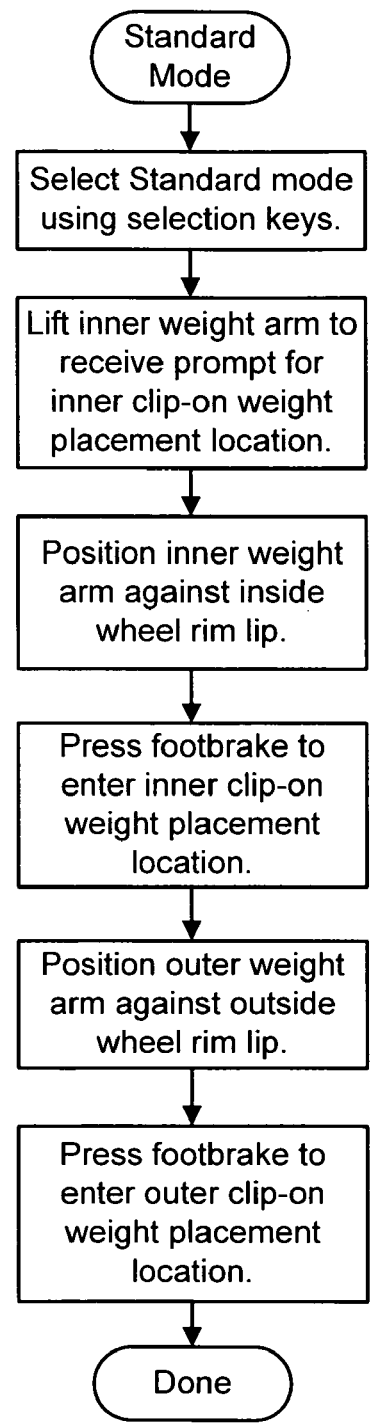
FIG. 8 is a flow chart of a prior art STANDARD mode selection process.

Once the inner dataset arm 16 is moved from the "home" or "stored" position by an operator, the vehicle wheel balancer system monitors the position of the inner dataset arm 16 relative to the wheel mounting shaft (i.e. if the dataset arm is swung down as shown in FIGS. 2 and 3, or swung up as shown in FIG. 6) to identify the possible types of imbalance correction weights 12 which could be applied at the current location of the selected point. To accomplish this, the vehicle wheel balancer system may monitor movement of the dataset arm using a radial position sensor, or similar sensor, such as a linear Hall effect sensor. Alternatively, a mechanically triggered logic switch may be operatively coupled to the inner dataset arm 16 to cycle between first and second settings as the inner dataset arm 16 is moved passed a midpoint between a vertically "up" position and a vertically "down" position. Those of ordinary skill in the art will readily recognize that the specific mechanical configuration of the inner and outer dataset arms 16, 18 will determine the specific mechanical or electrical sensors which are utilized to monitor the associated positions.

A sequence of steps for automatically identifying a type of imbalance correction weight for application to a vehicle wheel assembly, and a corresponding mode of operation, are be described below with reference to the operational state diagram shown in FIG. 11. Beginning with an initial START state, in which both dataset arms 16, 18 are in the "home" or "stored" positions on the vehicle wheel balancer system 10, an operator guided movement of either the inner dataset arm or the outer dataset arm will initiate the automatic weight selection process by selecting an initial mode of operation for the vehicle wheel balancer system 10.

Figure 11:
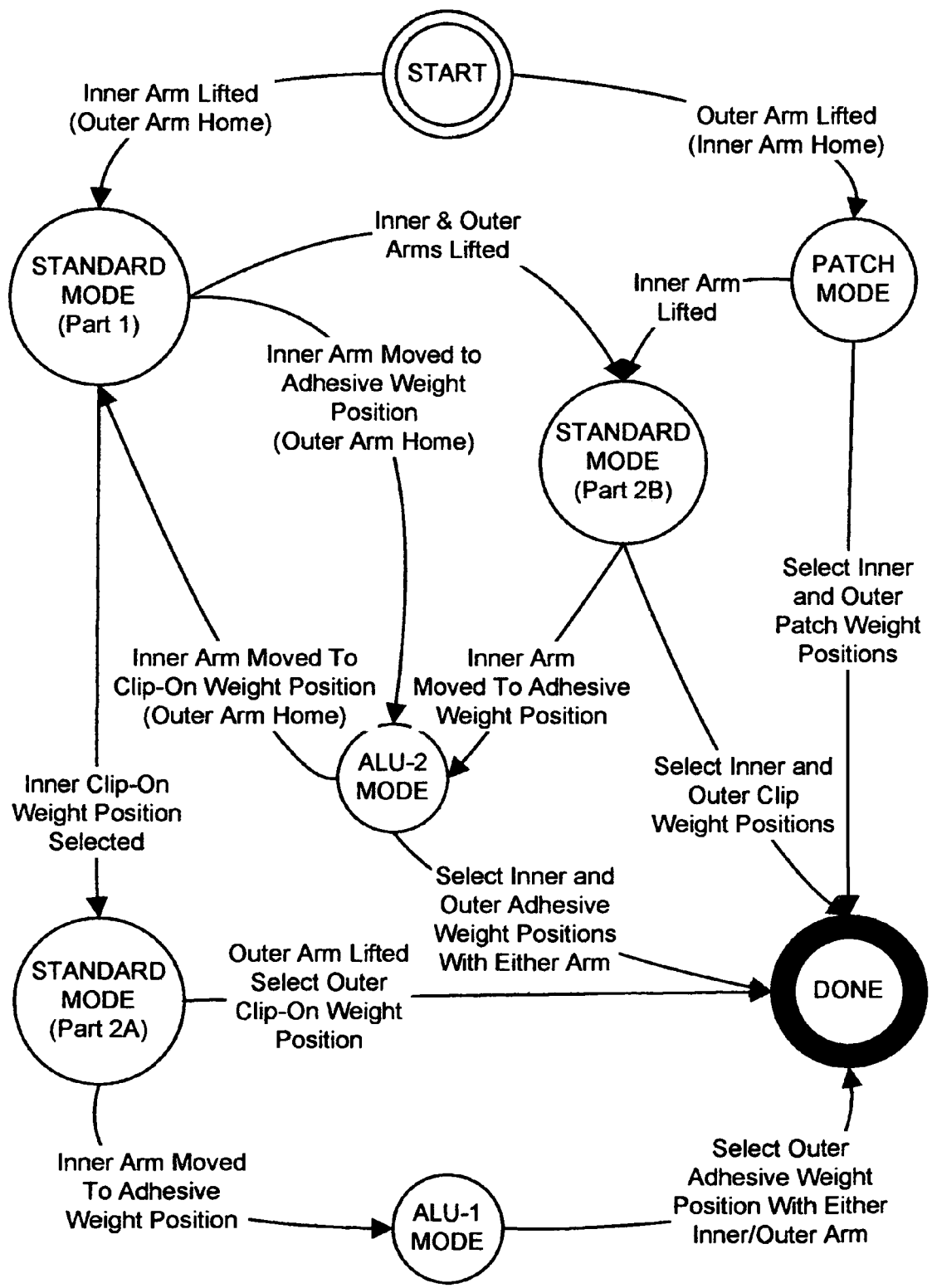
FIG. 11 is a state table representation of an automatic imbalance correction weight mode selection process of the present invention for use with a vehicle wheel balancer system.

When the inner dataset arm 16 is initially moved, the vehicle wheel balancer system 10 is configured to switch from the START state to a first part of the standard weight placement mode, identified as STANDARD MODE (part 1) in FIG. 11. When in the first part of the standard mode, the operator is directed to measure or identify both the inner and outer wheel rim lips of the vehicle wheel assembly undergoing the balancing procedure, using the inner dataset arm 16 and the outer dataset arm 18. If the operator positions the inner dataset arm 16 against the inner wheel rim lip, and selects or identifies this position to the vehicle wheel balancer system by any suitable means, such as the pressing of a footbrake, the vehicle wheel balancer transitions to the second part of the standard weight placement mode, identified as STANDARD MODE (part 2) in FIG. 11.

In the second part of the standard weigh placement mode, the operator has selected the first or inner imbalance correction weight placement location as a point on the vehicle wheel rim lip, limiting the type of imbalance correction weight 12 for application at the inner plane to a clip-on imbalance correction weight 12C. Only two types of imbalance correction weights 12 may be applied at the outer plane once the inner plane imbalance correction weight 12 is identified as a clip-on imbalance correction weight 12. The operator is next directed to measure or identify the location of the outer imbalance correction plane for the vehicle wheel assembly undergoing the balancing procedure, using either the inner dataset arm 16 or the outer dataset arm 18. If the operator uses the outer dataset arm 18, and moves the selected point into contact with the outer vehicle wheel rim lip for application of a clip-on imbalance correction weight 12C, and selects a position on the outer wheel rim lip, the vehicle wheel balancer remains in the second part of the STANDARD mode of operation, and suitable clip-on imbalance correction weights for application to the inner and outer vehicle wheel rim lips are subsequently identified, completing the imbalance correction process.

If, however, the operator positions either the inner dataset arm 16, or the outer dataset arm 18, to identify a placement location on either the inner vehicle wheel rim surface, or outer vehicle wheel rim surface, for application of an adhesive imbalance correction weight 12A, the vehicle wheel balancer system 10 will transition to the ALU-1 mode of operation, as shown in FIG. 11. Movement of either the inner dataset arm 16 or the outer dataset arm 18 past the inner and outer wheel rim lips is identified by the vehicle wheel balancer system by comparing the spatial position of the selected point on the dataset arms 16, 18 to previously entered dimensions of the vehicle wheel assembly, facilitating automatic transitioning to the ALU-1 mode of operation. Once in the ALU-1 mode of operation, the operator identifies the vertical plane within the vehicle wheel assembly for placement of an adhesive imbalance correction weight 12A, and suitable inner clip-on imbalance correction weight and outer adhesive imbalance correction weight amounts are subsequently identified, completing the imbalance correction process.

Returning to FIG. 11, when the vehicle wheel balancer system 10 is in the first part of the standard mode, if the operator does not position the inner dataset arm 16 against the inner wheel rim lip to select or identify the clip-on imbalance correction weight position, but instead moves the inner data arm 16 to a position in proximity to a vehicle wheel rim surface for application of an adhesive imbalance correction weight 12A, the vehicle wheel balancer system will switch to the ALU-2 mode of operation. When the inner dataset arm 16 is rotated into a downward position inside the wheel rim, the inner dataset arm 16 is no longer positioned for placement of a clip-on imbalance correction weight 12C at the inner wheel rim lip. Only the ALU-2 weight mode requires placement of an adhesive imbalance correction weight 12A in the inner weight plane position. If the operator subsequently rotates the inner dataset arm back to an upward position outside the wheel rim interior space, the vehicle wheel balancer will return the imbalance correction weight display back to the first part of the standard mode. Once in the ALU-2 mode of operation, the operator may then proceed to identifies the inner and outer vertical planes within the vehicle wheel assembly for placement of inner and outer adhesive imbalance correction weights 12A, completing the imbalance correction process.

Returning again to FIG. 11, when the vehicle wheel balancer system 10 is in the first part of the standard mode, if the operator does select or identify the clip-on imbalance correction weight position, but instead moves the outer dataset arm 18 to a clip-on imbalance correction weight position, the vehicle wheel balancer may optionally switch to a variation of the second part of the standard weight mode, identified as Part 2B. In this mode, it is assumed that the operator will identify both clip-on weight locations (i.e., the inner and outer planes) simultaneously by any suitable means, such as the pressing of a foot brake, upon positioning of the inner and outer dataset arms.

Returning to the start state of FIG. 11, if the outer dataset arm 18 is initially moved, the vehicle wheel balancer system 10 is configured to switch from the START state to a patch weight placement mode, identified as PATCH MODE. Patch mode is the only operational state of the vehicle wheel balancer system 10 which utilizes the outer dataset arm to facilitate placement of imbalance correction weights (patch weights) in both the inner and outer imbalance correction planes. Once in the PATCH MODE, the operator is directed to identify desired imbalance correction weight placement locations using the outer dataset arm 18. If the operator subsequently lifts the inner dataset arm 16 while in the PATCH mode, the vehicle wheel balancer system 10 will switch to the first part of the STANDARD weight mode. This is based on the assumption that if the inner dataset arm 16 is lifted, the operator did not intend to use PATCH mode, and more likely, selection of a different weight mode was intended, with the outer dataset arm 18 merely being lifted before the inner dataset arm 16.

If the intended mode was really ALU-1 or ALU-2 with the outer adhesive weight on the visible side of the wheel rim, the operator may have simply lifted the outer dataset arm 18 before the inner dataset arm 16. If the ALU-1 weight mode was intended, all the operator is required to do is to lift the inner dataset arm 16 to switch to the first part of the standard weight mode, select the placement position of the inner clip-on weight 12C, and then swing the inner dataset arm 16 downward, causing the vehicle wheel balancer to change to the ALU-1 weight placement mode. Since the outer dataset arm 18 is already away from a home position, the vehicle wheel balancer system will display the outer imbalance correction plane on the visible side of the wheel rim, and expect the operator to identify the plane position using the outer dataset arm 18.

If the intended weight placement mode was the ALU-2 mode, all the operator is required to do is to lift the inner dataset arm 16 and swing it downward towards the inner adhesive weight placement location, causing the vehicle wheel balancer to switch from the first part of STANDARD mode to the ALU-2 mode. Since the outer dataset arm 18 is away from a home position, the vehicle wheel balancer will display the outer imbalance correction plane on the visible side of the wheel rim, and expect the operator to identify the plane position using the outer dataset arm 18.

Vehicle wheel balancer systems 10 typically provide an operator with an option to correct both static imbalance and dynamic imbalance in a vehicle wheel assembly. Each of the imbalance correction modes (weight arrangements) previously described may be utilized for both dynamic (two-plane) balancing or static (single-plane) balancing of a vehicle wheel assembly. The methods of the present invention eliminate the need for an operator to manually select between static and dynamic balancing of a vehicle wheel assembly with a separate step via keypad, knob, or other input device. If the inner dataset arm 16 is used to select an inner imbalance weight correction plane, and then is returned to a home or stored position without selection of an outer imbalance correction plane, the vehicle wheel balancer system is configured to assume that the static (single-plane) mode of operation is desired, and to change the display of information to the operator accordingly.

Conversely, if the inner dataset arm 16 is used to select an inner imbalance weight correction plane, and either the inner dataset arm 16 or outer dataset arm 18 is moved to identify an outer imbalance correction plane, the vehicle wheel balancer system is configured to assume that the dynamic (double-plane) mode of operation is desired, and to change the display of information to the operator accordingly.

Essentially, using the methods of the present invention, the operator guided movement of a dataset arm to a desired point on the wheel rim for imbalance correction weight plane input identifies the complete imbalance correction weight arrangement for the vehicle wheel balancer system 10, including the imbalance correction weight types and selection of a static or dynamic modes of operation.

Those of ordinary skill in the art will recognize that the specific positional measurements of the dataset arm locations will may be varied for use with different dataset arm geometries to accomplish the features of the present invention. For example, some vehicle wheel balancers systems 10 may incorporate a telescoping inner weight placement arm designed to pivot up and down, but which has no portion configured to "swing up or down". If the position of an inner wheel rim lip is identified by database recall, ultrasonic methods, or by optical means, the vehicle wheel balancer may be configured to detect when the telescoping arm is extended past the inner rim lip and into the wheel rim interior space for effecting a transition from a clip-on imbalance correction weight mode to an adhesive imbalance correction weight mode, corresponding to the selections process described above. Similarly, elaborate weight dataset arms with multiple joints and sensors may be constructed to provide the same functionality without departing from the scope of the invention.

The present invention can be embodied in part in the form of computer-implemented processes and apparatuses for practicing those processes. The present invention can also be embodied in part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method for automatic selection of an imbalance correction weight mode for application of an imbalance correction weight onto a vehicle wheel assembly mounted on a vehicle wheel balancer system having at least one dataset arm, comprising:

moving the dataset arm from an initial rest position;
detecting a current position of the dataset arm; and
automatically selecting an imbalance correction weight mode for an imbalance correction weight calculation responsive to said detected current position of the dataset arm.

2. The method of claim 1 for imbalance correction weight mode selection further including the steps of:

moving a second dataset arm from an initial rest position;
detecting a current position of a second dataset arm relative to said vehicle wheel rim mounted to the vehicle wheel balancer system; and
wherein said step of automatically selecting is further responsive to said current position of said second dataset arm to automatically select said imbalance correction weight mode.

3. The method of claim 1 for imbalance correction weight mode selection wherein said imbalance correction weight mode is selected from a set including a clip-on imbalance correction weight mode, an adhesive imbalance correction weight mode, a patch imbalance correction weight mode, and a combination mode for a clip-on imbalance correction weight and an adhesive imbalance correction weight.

4. The method of claim 1 for imbalance correction weight mode selection wherein said imbalance correction weight mode is selected from a set including a static (single-plane) mode and a dynamic (two-plane) mode.

5. The method of claim 1 for imbalance correction weight mode selection wherein said imbalance correction weight mode is selected from a set including a clip-weight mode, a patch-weight mode, an adhesive-weight mode, and a mode utilizing a combination of clip-weights and adhesive-weights.

6. A improved vehicle wheel balancer system having a processing unit configured with a set of operating instructions and at least one dataset arm, the improvement comprising:

at least one sensor configured to communicate a signal representative of a current position of the dataset arm to the processing unit;
the processing unit configured with a set of operating instructions for automatically selecting an imbalance correction weight mode responsive to said signal representative of said current position of the dataset arm.

7. The improved vehicle wheel balancer system of claim 6 further including at least one sensor configured to communicate a signal representative of a current position of a second dataset arm to the processing unit; and
wherein the processing unit is further configured with a set of operating instructions for altering said selection of an imbalance correction weight mode responsive to said signal representative of said current position of said second dataset arm.

8. The improved vehicle wheel balancer system of claim 6 wherein said processing unit is further configured to select said imbalance correction weight mode from a set including a clip-on imbalance correction weight mode, an adhesive imbalance correction weight mode, a patch imbalance correction weight mode, and a combination mode for a clip-on imbalance correction weight and an adhesive imbalance correction weight.

9. The improved vehicle wheel balancer system of claim 6 wherein said processing unit is further configured to select said imbalance correction weight mode from a set including a static (single-plane) mode and a dynamic (two-plane) mode.

10. A method for automatically selecting a mode of operation for a vehicle wheel balancer system having at least one dataset arm, during an imbalance correction procedure for a vehicle wheel assembly mounted to the vehicle wheel balancer system and having identifiable inner and outer wheel rim planes, comprising:

detecting operator-directed movement of the dataset arm from a rest position;

automatically selecting an imbalance correction weight mode of operation in response to said detected operator-directed movement of said dataset arm from an initial rest position.

11. The method of claim 10 for automatically selecting a mode of operation for a vehicle wheel balancer system wherein said vehicle wheel balancer system includes an inner dataset arm and an outer dataset arm; and wherein said mode of operation is automatically selected as a first imbalance correction weight mode of operation in response to a detected movement of said inner dataset arm from an initial rest position, or as a second imbalance correction weight mode of operation in response to a detected movement of said outer dataset arm from an initial rest position.

12. The method of claim 11 wherein responsive to said automatic selection of said second mode of operation, further including the step of identifying to said vehicle wheel balancer system, at least one patch imbalance correction weight placement location on a vehicle wheel assembly using said outer dataset arm.

13. The method of claim 11 wherein responsive to said automatic selection of said second mode of operation, further including the step of automatically switching said vehicle wheel balancer system to said first imbalance correction weight mode of operation in response to a subsequent movement of the inner dataset arm from an initial rest position.

14. The method of claim 11 wherein responsive to said automatic selection of said first mode of operation, further including the step of automatically identifying an inner clip-on imbalance correction weight placement location on an inner rim lip of said wheel assembly.

15. The method of claim 14 wherein responsive to said identification of an inner clip-on imbalance correction weight placement location, further including the step of automatically identifying an outer clip-on imbalance correction weight placement location on an outer rim lip of said wheel assembly.

16. The method of claim 14 wherein responsive to identification of an inner clip-on imbalance correction weight placement location and to subsequent movement of either the inner dataset arm or the outer dataset arm towards an adhesive imbalance correction weight placement location on a surface of said wheel assembly between said inner and outer wheel rim planes, further including the step of switching to a third imbalance correction weight mode of operation.

17. The method of claim 16 wherein responsive to said switch to said third mode of operation, further including the step of identifying an outer adhesive imbalance correction weight placement location.

18. The method of claim 11 wherein responsive to said selection of said first mode of operation, and to subsequent movement of said inner dataset arm towards an adhesive imbalance correction weight placement location on a surface of said wheel assembly between said inner and outer wheel rim planes, further including the step of selecting a third imbalance correction weight mode of operation.

19. The method of claim 18 wherein responsive to said selection of said third mode of operation, further including the step of identifying inner and outer adhesive imbalance correction weight placement locations.

20. The method of claim 11 wherein responsive to said selection of said first mode of operation, and to subsequent movement of said outer dataset arm from said initial rest position, further including the step of automatically identifying both inner and outer clip-on imbalance correction weight placement locations on said vehicle wheel assembly mounted to said vehicle wheel balancer system.

21. The method of claim 20 wherein responsive to subsequent movement of said inner dataset arm towards an adhesive imbalance correction weight placement location on a surface of said wheel assembly between said inner and outer wheel rim planes, further including the step of automatically selecting a third imbalance correction weight mode of operation for said vehicle wheel balancer system.

22. The method of claim 21 wherein responsive to said selection of said third mode of operation, further including the step of identifying inner and outer adhesive imbalance correction weight placement locations on said surface of said wheel assembly between said inner and outer wheel rim lips.

* * * * *